INVENTOR:
Adolf Brunner
BY
ATTORNEY

Patented Oct. 3, 1933

1,928,809

UNITED STATES PATENT OFFICE 1,928,809

INDICATOR APPARATUS FOR MULTI-CYLINDER ENGINES

Adolf Brunner, Winterthur, Switzerland, assignor to the firm Sulzer Frères Société Anonyme, Winterthur, Switzerland Application November 14, 1931, Serial No. 575,140, and in Switzerland November 21, 1930

2 Claims. (Cl. 234—24)

This invention relates to indicator driving apparatus for multi-cylinder reciprocating engines and of the kind in which movement is transmitted from the engine to an indicating device such, for example, as a rotary drum or the like so as to actuate the device in accordance with the reciprocating movement of the engine piston.

According to the present invention the apparatus comprises a crank rotated by the engine and a member reciprocated by the crank, such member being angularly adjustable about the axis of rotation of the crank, if desired while the engine is working, so as to bring the reciprocating movement of the member into synchronism with any one of the cylinders.

Conveniently the reciprocating movement of the member reciprocated by the crank is transmitted to the indicater through flexible transmission means, such as a cord or the like which is so guided as to pass through the axis about which the reciprocated member is angularly adjustable, whereby variation in the effective length of the flexible transmission means in accordance with variations in the angular position of the reciprocated member is prevented.

Figure 1:
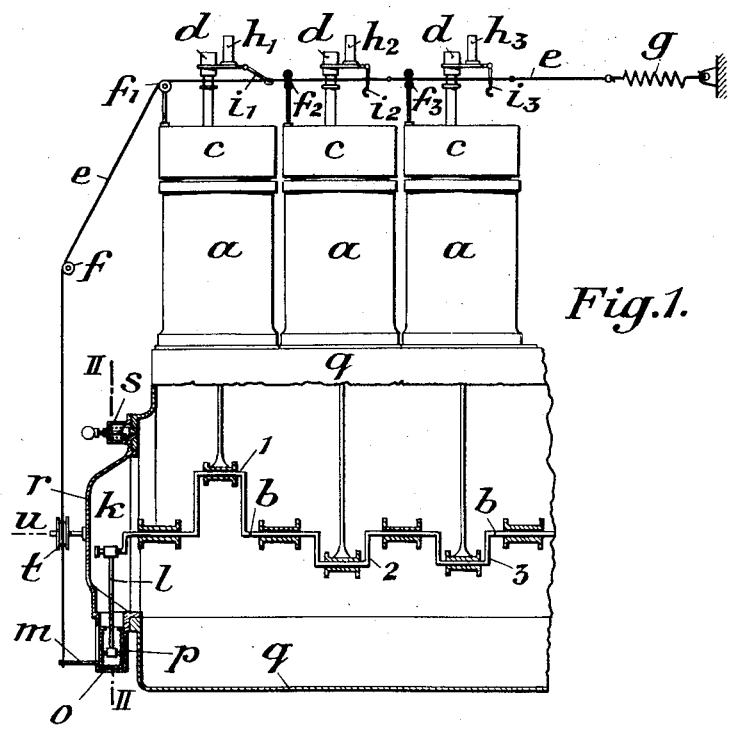
Figure 2:
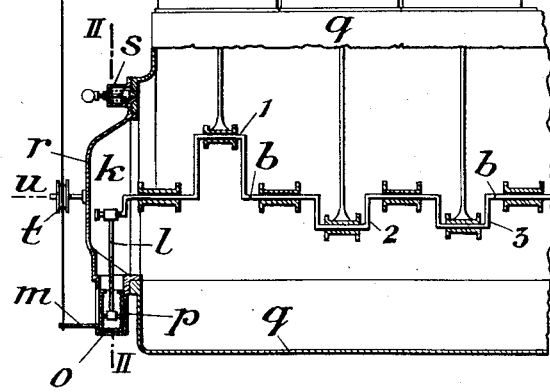
Figure 3:
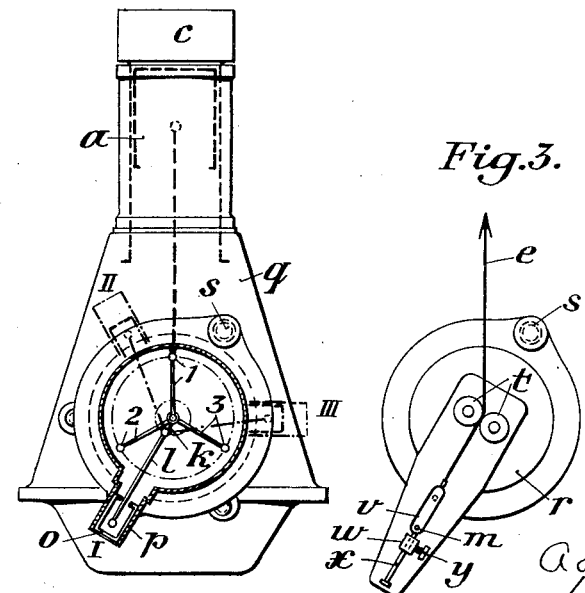

In the accompanying drawing,

Figure 1 is a side elevation partly in section of a multi-cylinder internal combustion engine furnished with indicator driving apparatus in accordance with the present invention, Figure 2 is an end elevation on the line II—II of Figure 1, and Figure 3 shows in end elevation one form of the connection between the cord driving the indicators and its driving mechanism.

In the construction illustrated the engine has cylinders $a$, a crankshaft $b$ and cylinder heads $c$. Associated with each of the cylinder heads $c$ is an indicator device $d$ which is actuated by a cord $e$ guided over pulleys $f$, $f_1$ and connected through a spring $g$ to a fixed point or anchor. The indicator devices $d$ are furnished with oscillatable drums $h_1$, $h_2$, $h_3$ respectively, each of which can be connected to or disconnected from the transmission cord $e$ by means of latches $i_1$, $i_2$, $i_3$ so that each drum when connected to the cord is twisted first in one direction against the action of a winding spring (not shown) and then in the reverse direction by such spring in accordance with the reciprocating motion of the cord.

The crankshaft $b$, three of the main cranks of which are indicated at 1, 2 and 3, is furnished with an external crank $k$ connected by a connecting rod $l$ to a piston $o$ adapted to reciprocate within a cylinder $p$ formed in a casing $r$ which is rotatable on the exterior of the engine casing $q$ about a horizontal axis indicated at $u$ in alignment with the axis of the crankshaft $b$. The piston $o$ carries a pin $m$ which passes through a slot formed radially in the rotatable casing $r$, and the cord $e$ is furnished at its free end with a loop $v$ (Figure 3) through which the end of the pin $m$ passes freely, a rod $x$ at one end of the loop $v$ passing through a bush $w$ within which the pin can be locked by a stud $y$. A spring-controlled locking device $s$ is provided by which the rotatable casing $r$ can be locked to the engine casing $q$ in the desired angular position relatively to the axis $u$, the cord $e$ being guided between rollers $t$ which are so arranged that the cord always passes through the axis $u$.

When it is desired to actuate the indicator associated with the piston connected to the crank 1 the drum $h_1$ is coupled to the cord $e$ by means of the latch $i_1$, the latches $i_2$ and $i_3$ being disconnected, whereupon the casing $r$ is rotated about the axis $u$ until the piston $o$ and cylinder $p$ are in the position I as shown in Figure 2. The arrangement is such that the engine piston associated with the crank 1 and the piston $o$ connected to the crank $k$ will now be in synchronism i. e. will simultaneously arrive at their dead centre position and the reciprocating movement produced on the pin $m$ by the piston $o$ will thus synchronize with the reciprocating movement of the piston associated with the crank 1, the reciprocating movement of the pin $m$ being transmitted through the cord $e$ to the drum $h_1$.

Assuming that it is now desired to actuate the indicator associated with the piston connected to the crank 2 without stopping the engine the latch $i_1$ is disconnected from the cord $e$ and the latch $i_2$ connected thereto, whereupon the locking device $s$ is released and the rotatable casing $r$ rotated untli the piston $o$ and cylinder $p$ are in the position II, whereupon the engine piston associated with the crank 2 and the piston $o$ will be in synchronism i. e. will arrive simultaneously at their dead centres. The reciprocating movement produced on the cord $e$ will therefore be in synchronism with the reciprocating movement of the engine piston associated with the crank 2. Similarly for actuating the indicator associated with the piston which is connected to the crank 3, the latch $i_3$ is connected to the cord $e$ instead of the latch $i_2$ and the rotatable casing $r$ is set with the cylinder $p$ in the position III so that the reciprocating movement produced on the cord $e$ will synchronize with the reciprocating movement of the piston connected to the crank 3.

The locking stud $y$ is normally in the released position so that the outer end of the loop $v$ is maintained in engagement with the pin $m$ by the action of the spring $g$ whereby the reciprocating movement of the pin $m$ is imparted to the cord $e$. When, however, the rod $x$ is locked within the bush $w$ in the position shown in Figure 3 by tightening the stud $y$, the pin $m$ will reciprocate in the loop $v$ without imparting movement to the cord $e$. In this way the cord can be connected to or disconnected from the piston $o$ as desired and unnecessary wear during the working of the engine thus reduced to a minimum.

It will be seen that since the cord $e$ is at all times constrained to pass through the axis of rotation $u$ the effective length of the cord is practically unaffected by angular adjustment of the casing $r$.

It will be appreciated that the construction above described is given by way of example only and that details may be modified without departing from the scope of the invention.

I claim:

1. In an indicator driving apparatus of the kind set forth the combination with a crank rotated by the pistons of a multicylinder engine, of a member reciprocated by the crank and angularly adjustable about the axis of rotation of the crank while the engine is running so as to bring the reciprocating movement of the member into synchronism with any one of the pistons.

2. In an indicator driving apparatus as claimed in claim 1 the arrangement that the reciprocating motion of the member reciprocated by the crank is transmitted to the indicator through flexible transmission means such as a cord, this cord being so guided as to pass through the axis about which the reciprocated member is angularly adjustable.

ADOLF BRUNNER.